United States Patent Office 2,984,670
Patented May 16, 1961

2,984,670
NOVEL 3-(1-HYDROXY-1-PHENYL-3-AMINO-PROPYL) INDOLES

Jacob Szmuszkovicz, Portage Township, Kalamazoo County, and William C. Anthony, Kalamazoo, Mich., assignors to The Upjohn Company, Kalamazoo, Mich., a corporation of Delaware No Drawing. Filed May 22, 1959, Ser. No. 814,952

8 Claims. (Cl. 260—319)

The present invention relates to novel organic compounds and more specifically relates to 3-(1-hydroxy-1-phenyl-3-aminopropyl)indoles and salts thereof.

The novel 3-(1-hydroxy-1-phenyl-3-aminopropyl)indoles can for the most part be represented by the following general formula:

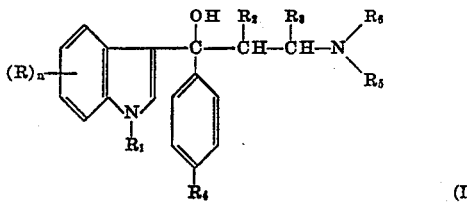

wherein $n$ is an integer from zero to 4, inclusive; R represents hydroxy, an aralkoxy radical containing from 7 to 15 carbon atoms, inclusive, such as benzyloxy, benzhydryloxy, and the like, alkylbenzyloxy such as p-methylbenzyloxy, p,p'-dimethylbenzhydryloxy, and the like, halobenzyloxy such as p-chlorobenzyloxy, p,p'-dichlorobenzhydryloxy, and the like, alkoxybenzyloxy such as p-ethoxybenzyloxy, p,p'-dimethoxybenzhydryloxy, and the like, a lower-alkoxy radical containing from 1 to 8 carbon atoms, inclusive, such as methoxy, ethoxy, butoxy, propoxy, hexyloxy, octyloxy, and the like, and when $n$ is less than four it is of course understood that the remaining benzene-ring positions are not substituted; $R_1$ represents hydrogen and a lower-alkyl radical containing from 1 to 6 carbon atoms, inclusive, such as methyl, ethyl, propyl, butyl, isopropyl, isobutyl, hexyl, and the like; $R_2$ and $R_3$ represent hydrogen and a lower-alkyl radical containing from 1 to 4 carbon atoms, inclusive; $R_4$ represents hydrogen, halogen, a lower-alkyl radical containing from 1 to 4 carbon atoms, inclusive, and a lower-alkoxy radical containing from 1 to 4 carbon atoms, inclusive; $R_5$ and $R_6$ represent a lower-alkyl radical containing from 1 to 8 carbon atoms, inclusive, such as methyl, ethyl, propyl, butyl, isobutyl, hexyl, octyl, and the like, a cycloalkyl radical containing from 4 to 8 carbon atoms, inclusive, such as cyclobutyl, cyclopentyl, cyclohexyl, methylcyclohexyl, cycloheptyl, cyclooctyl, and the like, an aralkyl radical containing from 7 to 13 carbon atoms, inclusive, such as benzyl, phenethyl, phenylpropyl, benzhydryl, and the like, an aryl radical of the benzene and naphthalene series containing from 6 to 10 carbon atoms, inclusive, such as phenyl, tolyl, naphthyl, and the like, and $R_5$ and $R_6$ when taken together with —N< also represent a heterocyclic amino radical containing 4 to 6 carbon atoms. Representative

radicals include, e.g., dimethylamino, diethylamino, dipropylamino, dibutylamino, dihexylamino, methylethylamino, ethylpropylamino, methylisoctylamino, propylcyclohexylamino, dibenzylamino, diphenethylamino, dicyclohexylamino, N-methylanilino, morpholinyl, piperidyl, 2-methylpiperidyl, pyrrolidyl, 2,2-dimethylpyrrolidyl, thiamorpholinyl, hexamethyleneimino, and the like. The novel compounds of the invention also comprise the acid addition and quaternary ammonium salts of the compounds having the above general Formula I.

The acid addition salts of the invention comprise salts of amines having the Formula I with organic and inorganic acids. These salts can be prepared by conventional methods. For example, the amines can be dissolved in an aqueous solution of the appropriate acid and the salt can be isolated by evaporation of the solution. Alternatively, the amine, in solution in an organic solvent such as methanol, ethanol, ethyl acetate, ether, and the like, can be treated with the appropriate acid and according to the nature of the solvent employed the desired salt will separate spontaneously or can be precipitated by the addition of a solvent in which the salt is insoluble. It is generally desirable to utilize substantially stoichiometric quantities of the acids in order to avoid undesirable side-reactions. Where the salts of the invention are to be employed for therapeutic purposes as hereinafter described it is necessary that the salts be derived from pharmacologically acceptable acids. Suitable such acids, include sulfuric, hydrochloric, hydrobromic, nitric, phosphoric, benzoic, p-toluenesulfonic, salicyclic, acetic, propionic, tartaric, citric, and succinic acids, and the like. Where the salts of the invention are to be employed in agriculture as hereinafter described, the toxicity to humans of the acids employed to form the salts is less important and, therefore, in addition to the above acids, acids such as oxalic, thiocyanic, and the like, can be employed to form the salts.

The quaternary ammonium salts of the invention comprise salts of amines having the Formula I with esters of inorganic and organic acids. These salts can be prepared by conventional methods. For example, the amines can be converted to the quaternary ammonium salts by reacting the amine in an inert solvent (e.g., acetone, methyl ethyl ketone, methanol, and the like) with at least an equivalent amount of a quaternary ammonium salt-forming compound, i.e., ester, such as methyl iodide, ethyl bromide, octyl bromide, allyl chloride, benzyl chloride, dimethyl sulfate, methyl p-toluenesulfonate, and the like. According to the nature of the solvent employed the desired salt will separate spontaneously or can be precipitated by the addition of a solvent in which the salt is insoluble.

The novel compounds of the present invention are useful hypotensive agents. In addition, the novel compounds are also central nervous system depressants as evidenced by their anticonvulsant properties and their ability to reduce motor activity. The 1-unsubstituted compounds are preferred as central nervous system depressants.

The novel compounds are also useful as agricultural pesticides. For example, the novel compounds can be used in combatting powdery mildew on cucumbers and for this purpose they can be admixed with diluents and carriers commonly employed in the application of herbicides and pesticides to soil and growing crops. Thus the compositions can be employed as dusts, dispersible powders, aqueous dispersions, emulsions, etc.

Furthermore, the novel 3-(1-hydroxyl-1-phenyl-3-aminopropyl)indoles of above Formula I are useful in accordance with U.S. Patents 1,915,334 and 2,075,359 in forming amine fluosilicate mothproofing agents and, in accordance with U.S. Patents 2,425,320 and 2,606,155, in forming amine thiocyanate-formaldehyde condensation products for use as pickling inhibitors.

The novel compounds of the present invention can be prepared by the process shown by Ruddy et al., J. Am. Chem. Soc. 72, 718, 1950, which involves the reaction of an aminoalkanophenone with a Grignard reagent. More specifically, the process of the present invention involves reacting a 3-indolyl 2-aminoethyl ketone having the Formula II below, with a Grignard reagent. For reaction purposes the 3-indolyl 2-aminoethyl ketone is employed in the form of the free base or as an acid addition salt, the preferred salts being those derived from strong inorganic acids such as hydrochloric, hydrobromic, hydriodic, sulfuric, nitric, and phosphoric acids, and the like. The Grignard reagent is one which contains as the organic moiety thereof a substituted or unsubstituted phenyl radical having the formula:

wherein $R_4$ is as defined above. Representative Grignard reagents include phenyl magnesium bromide, phenyl magnesium iodide, p-tolyl magnesium bromide, p-isobutylphenyl magnesium bromide, p-anisyl magnesium bromide, p-butoxyphenyl magnesium bromide, p-chlorophenyl magnesium bromide, p-fluorophenyl magnesium bromide, and the like. Stoichiometric amounts of the Grignard reagent and 3-indolyl 2-aminoethyl ketone can be employed if so desired, although it is generally advantageous to employ an excess of the former. Those skilled in the art will appreciate that in the case of an acid addition salt of a compound having Formula II below, an excess of Grignard reagent should be employed since a portion of the Grignard reagent is consumed by reaction with the acid moiety thereof. Similarly when $R_1$ is hydrogen in Formula II a portion of the Grignard reagent is consumed by reaction with the imino group thereof, the imino group being regenerated by hydrolysis of the resulting organic-metallo intermediate. These considerations should be taken into account when selecting the desired amounts of 3-indolyl 2-aminoethyl ketone and Grignard reactants.

The starting 3-indolyl 2-aminoethyl ketones can be represented by the general formula:

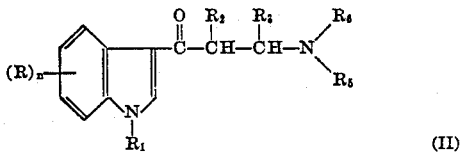

wherein $n$, $R$, $R_1$, $R_2$, $R_3$, $R_5$, and $R_6$ have the same values noted above.

The 3-indolyl 2-aminoethyl ketones can be prepared in the manner more fully described in copending application Serial No. 770,275, filed October 29, 1958. For example, the 1-alkyl-3-indolyl 2-aminoethyl ketones can be prepared by reacting a 1-alkyl-3-acylindole having a hydrogen atom alpha to the carbonyl group with an aliphatic aldehyde and a secondary amine in the presence of an inert solvent. It is preferred to employ equimolar quantities of reactants although other quantities can also be employed, if desired. The reaction is generally carried out under acid conditions, i.e., a pH of less than seven. Various aliphatic aldehydes can be employed, e.g., aqueous formaldehyde, paraformaldehyde, acetaldehyde, butyraldehyde, isobutyraldehyde, valeraldehyde, and the like. Inert solvents can include methanol, ethanol, and isoamyl alcohol although when aqueous formaldehyde is employed no additional solvent is necessary. Various secondary amines can be employed in the reaction such as the secondary alkyl, cycloalkyl, aralkyl, and aryl amines, as well as heterocyclic amines. Representative amines include dimethylamine, diethylamine, methylethylamine, diisopropylamine, dibenzylamine, diphenethylamine, dicyclohexylamine, N-methylaniline, 2-methylpiperidine, piperidine, thiamorpholine, pyrrolidine, morpholine, and the like.

The acid conditions generally necessary for completion of the reaction can be brought about by adding the amine as an acid addition salt such as the hydrochloride, sulfate, hydrobromide, and the like. The acid conditions can also be brought about by the addition of an acid such as acetic, hydrochloric, phosphoric, sulfuric, hydrobromic, and the like, to the reaction mixture.

The reaction is carried out at a temperature between about fifty and about 100 degrees centigrade, advantageously at a temperature between about 65 and about 85 degrees centigrade.

The 1-unsubstituted-3-indolyl 2-aminoethyl ketones can be prepared by reacting a 1-unsubstituted-3-acylindole with an aliphatic aldehyde and a secondary amine and then subjecting the resulting 1-aminomethyl-3-indolyl 2-aminoethyl ketone to alkaline hydrolysis utilizing, for example, potassium carbonate, sodium hydroxide, and the like. The alkaline hydrolysis results in a cleavage of the 1-aminomethyl substituent to produce a 1-unsubstituted-3-indolyl 2-aminoethyl ketone. In preparing the 1-aminomethyl-3-indolyl 2-aminoethyl ketones it is generally preferable to employ at least twice the molar amount of aliphatic aldehyde and secondary amine based on the starting 1-unsubstituted-3-acylindole. Otherwise the reaction conditions are substantially the same as noted above in the preparation of the 1-alkyl-3-indolyl 2-aminoethyl ketones.

The thus-produced 3-indolyl 2-aminoethyl ketones, i.e., 1-alkyl-3-indolyl 2-aminoethyl ketones and 1-unsubstituted-3-indolyl 2-aminoethyl ketones, can be recovered in a conventional manner from the reaction mixture. For example, the 3-indolyl 2-aminoethyl ketone acid addition salt precipitate can be recovered by filtration after cooling the reaction mixture. In some instances the acid addition salt is extremely soluble and will not readily precipitate upon cooling from the reaction mixture. In such cases, however, the 3-indolyl-2-aminoethyl ketone free base can be initially recovered by evaporating the reaction mixture, adding water to the residue, extracting the mixture with ether, adding a cold solution of an alkali-metal hydroxide to the aqueous solution, extracting with chloroform, drying the chloroform extract over sodium sulfate, and evaporating the chloroform solution. The acid addition salt can be prepared by adding the desired acid (e.g., hydrochloric, hydrobromic, hydriodic, sulfuric, nitric, phosphoric, and the like) to the dried chloroform solution of the free base.

The 3-acylindoles utilized in the preparation of the 3-indolyl 2-aminoethyl ketones can be prepared by the processes outlined in "Heterocyclic Compounds," Elderfield, volume 3, page 44, 1952—John Wiley and Sons, Inc. For example, 3-indolyl methyl ketone can be prepared by reacting acetyl chloride with 3-indolyl magnesium iodide.

1-alkyl-3-acylindoles can be prepared by utilizing the procedure of Baker, J. Chem. Soc. 1940, 458–60. For example, 1-alkyl-3-acylindoles can be prepared by reacting a 1-unsubstituted-3-acylindole with an alkyl halide in the presence of an alkali-metal alkoxide.

The various 4-, 5-, 6-, and 7-substituted indoles which can be employed as starting compounds for the preparation of the 3-acylindoles can be prepared by utilizing the procedures outlined in U.S. Patent 2,825,734.

The following examples are illustrative of the process and products of the present invention, but are not to be construed as limiting.

*Example 1.—3-(1-hydroxy-1-phenyl-3-dimethylaminopropyl)indole*

A. *3-indolyl 2-dimethylaminoethyl ketone free base.*— A mixture of 3-indolyl methyl ketone (15.9 g.; 0.1 mole) (Saxton, J. Chem. Soc. 1952, 3592), dimethylamine hydrochloride (8.15 g.; 0.1 mole), paraformaldehyde (4.5 g.; 0.15 mole) and 150 ml. of absolute ethanol was refluxed for 24 hours. The clear brown solution was allowed to stand at 25° C. for 24 hours and was then evaporated under vacuum to a viscous oil. Water (200 ml.) was added and the mixture was filtered. The aqueous filtrate was extracted twice with ether. The clear aqueous solution was then cooled in ice and made alkaline with a cold solution of potassium hydroxide (10 g.) in 25 ml. of water. The resulting oil was extracted thrice with chloroform and the chloroform extracts were washed twice with saturated sodium chloride solution, and dried over anhydrous sodium sulfate. The chloroform was removed by evaporation to produce 13.1 g. of 3-indolyl 2-dimethylaminoethyl ketone free base. The compound melted at 116–118.5° C.

B. *3 - (1 - hydroxy - 1 - phenyl - 3 - dimethylaminopropyl)indole free base.*—3-indolyl 2-dimethylaminoethyl ketone free base (1.08 g.; 0.005 mole) was dissolved in 50 ml. of warm benzene and the solution was added during one minute to a solution of phenyl magnesium bromide which had been prepared from bromobenzene (2.36 g.; 0.015 mole) and magnesium (0.4 g.) in 50 ml. of ether. The addition funnel was washed with 25 ml. of benzene, which was then added to the reaction mixture. The ether was removed by distillation and the reaction mixture was refluxed for two hours. The resulting dark green solution was cooled in ice and a solution of 5 g. of ammonium chloride in 25 ml. of water was added. The aqueous layer was separated, extracted with two 25-ml. portions of benzene, and was then discarded. The combined benzene solution was washed successively with water, aqueous sodium bicarbonate solution, water, aqueous sodium thiosulfate solution, water, and saturated aqueous sodium chloride solution. The washed solution was dried with anhydrous sodium sulfate and evaporated to give a brown semisolid. Trituration with ether produced 0.75 g. (51% yield) of a solid, M.P. 149–152° C. Recrystallization from benzene-petroleum ether (30–50° C. boiling range) gave pale yellow needles. The yellow product, 3-(1-hydroxy-1-phenyl-3-dimethylaminopropyl)-indole free base, sintered at 145° C. and melted at 150–151.5° C.

*Analysis.*—Calcd. for $C_{19}H_{22}N_2O$: C, 77.51; H, 7.53; N, 9.52. Found: C, 77.69; H, 7.44; N, 9.37.

The ultraviolet absorption spectrum showed maxima at 274.5 mμ, 281 mμ, and 290.5 mμ.

C. *3 - (1 - hydroxy - 1 - phenyl - 3 - dimethylaminopropyl)indole hydrochloride.*—3 - (1 - hydroxy - 1 - phenyl-3-dimethylaminopropyl)indole free base was dissolved in ether and a stoichiometric amount of gaseous hydrogen chloride was added thereto to produce 3-(1-hydroxy-1-phenyl-3-dimethylaminopropyl)indole hydrochloride.

D. *3 - (1 - hydroxy - 1 - phenyl - 3 - dimethylaminopropyl)indole ethobromide.*—Ethyl bromide was added to a solution of 3-(1-hydroxy-1-phenyl-3-dimethylaminopropyl)indole free base in acetone and after standing overnight the mixture was filtered to obtain 3-(1-hydroxy-1-phenyl-3-dimethylaminopropyl)indole ethobromide.

In the same manner as shown in Example 1, 3-[1-hydroxy - 1 - phenyl - 3 - (N - methylanilino)propyl]indole free base was prepared by utilizing N-methylaniline hydrochloride in lieu of dimethylamine hydrochloride.

*Example 2.—1-methyl-3-(1-hydroxy-1-phenyl-3-dimethylaminopropyl)indole*

A. *1-methyl-3-indolyl 2-dimethylaminoethyl ketone hydrochloride.*—A mixture of 13.6 g. of 1-methyl-3-acetylindole [C.A. 49, 1006$^d$ (1955)], 6.4 g. of dimethylamine hydrochloride, 3.54 g. of paraformaldehyde, and 120 ml. of ethanol was refluxed for 24 hours. The solution was evaporated under vacuum and the resulting crude solid was recrystallized twice from methanol to yield 1-methyl-3-indolyl 2-dimethylaminoethyl ketone hydrochloride which melted at 185–186° C.

B. *1 - methyl - 3 - (1 - hydroxy - 1 - phenyl - 3 - dimethylaminopropyl)indole free base.*—An ethereal solution containing 0.25 mole of phenyl magnesium bromide (84 ml. of commercial 3 molar reagent) was added during 25 minutes to a stirred suspension of 1-methyl-3-indolyl 2-dimethylaminoethyl ketone hydrochloride (26.7 g.; 0.1 mole) in 250 ml. of ether, under an atmosphere of nitrogen. The mixture was refluxed for 2.5 hours, cooled in ice, and a solution containing 27 g. of ammonium chloride in 150 ml. of water was added. The aqueous layer was separated and extracted twice with two 100-milliliter portions of ether. The combined organic solution was successively washed twice with water, twice with dilute aqueous sodium thiosulfate solution, once with water, once with saturated aqueous sodium chloride solution, and then dried with anhydrous sodium sulfate. Evaporation under reduced pressure at 25° C. gave 29.8 g. of a brown oil. A portion of the oil (28.2 g.) was dissolved in benzene and chromatographed on 700 g. of Florisil (magnesium silicate). Elution with Skellysolve B (mixture of hexanes) yielded 0.673 g. of diphenyl. Further elution with 1200 ml. of 5% acetone-95% Skellysolve B (by volume) gave oily fractions which did not crystallize. Further elution with 5740 ml. of 5% acetone-95% Skellysolve B followed by 4250 ml. of 10% acetone-90% Skellysolve B gave 3.13 g. of crystalline 1-methyl-3-(1-hydroxy - 1 - phenyl - 3 - dimethylaminopropyl)indole free base which melted at 148–149° C. after three crystallizations from benzene-petroleum ether (30–60° C. boiling range). A second crop of the same compound amounting to 0.5 g. also melted at 148–149° C. The mother liquor was evaporated to dryness and extracted with boiling petroleum ether to give as a residue 0.5 g. of the same compound melting at 147–148° C.

Additional elution with 1200 ml. of 15% acetone-85% Skellysolve B and 1200 ml. of 20% acetone-80% Skellysolve B gave fractions which were extracted with boiling petroleum ether to give a further 1.58 g. of 1-methyl-3-(1 - hydroxy - 1 - phenyl - 3 - dimethylaminopropyl)indole free base which melted at 147–148.5° C.

*Analysis.*—Calcd. for $C_{20}H_{24}N_2O$: C, 77.88; H, 7.84; N, 9.08. Found: C, 77.76; H, 7.70; N, 8.89.

C. *1 - methyl-3-(1-hydroxy-1-phenyl-3-dimethylaminopropyl)indole sulfate.*—In the same manner as shown in Example 1, part C, 1-methyl-3-(1-hydroxy-1-phenyl-3-dimethylaminopropyl)indole sulfate was prepared by utilizing stoichiometric quantities of 1-methyl-3-(1-hydroxy-1-phenyl-3-dimethylaminopropyl)indole free base and sulfuric acid in lieu of 3-(1-hydroxy-1-phenyl-3-dimethylaminopropyl)indole free base and hydrogen chloride.

D. *1 - methyl-3-(1-hydroxy-1-phenyl-3-dimethylaminopropyl)indole benzyl chloride.*—In the same manner as shown in Example 1, part D, 1-methyl-3-(1-hydroxy-1-phenyl-3-dimethylaminopropyl)indole benzyl chloride was prepared by utilizing 1-methyl-3-(1-hydroxy-1-phenyl-3-dimethylaminopropyl)indole free base and benzyl chloride in lieu of 3-(1-hydroxy-1-phenyl-3-dimethylaminopropyl)indole free base and ethyl bromide.

*Example 3.—3-[1-hydroxy-1-(p-chlorophenyl)-3-dimethylaminopropyl]indole*

A. *3-[1-hydroxy-1-(p-chlorophenyl)-3-dimethylaminopropyl]indole free base.*—A solution of 11.1 g. (0.05 mole) of 3-indolyl 2-dimethylaminoethyl ketone free base in 325 ml. of benzene was added to a solution of 0.15 mole of p-chlorophenyl magnesium bromide in 150 ml. of ether. The ether was removed by distillation and the mixture was then refluxed for 2 hours. The mixture was cooled and a solution of 50 g. of ammonium chloride in 250 ml. of water was added. The benzene solution was separated and washed successively with water, aqueous sodium bicarbonate solution, and water, and then dried with anhydrous magnesium sulfate. The dried solution was concentrated to yield a red oil.

The oil solidified upon being washed with ether and the resulting solid material was recrystallized three times from benzene to produce 2.2 g. of 3-[1-hydroxy-1-(p-chlorophenyl)-3-dimethylaminopropyl]indole free base. The compound melted at 142–143° C.

*Analysis.*—Calcd. for $C_{19}H_{21}ClN_2O$: C, 69.39; H, 6.44; N, 8.52; Cl, 10.78. Found: C, 69.44; H, 6.49; N, 8.54; Cl, 10.80.

B. *3-[1-hydroxy-1-(p-chlorophenyl)-3-dimethylaminopropyl]indole acetate.*—In the same manner as shown in Example 1, part C, 3-[1-hydroxy-1-(p-chlorophenyl)-3-dimethylaminopropyl]indole acetate was prepared by utilizing stoichiometric quantities of 3-[1-hydroxy-1-(p-chlorophenyl)-3-dimethylaminopropyl]indole free base and acetic acid in lieu of 3-(1-hydroxy-1-phenyl-3-dimethylaminopropyl)indole free base and hydrogen chloride.

C. *3-[1-hydroxy-1-(p-chlorophenyl)-3-dimethylaminopropyl]indole propyl iodide.*—In the same manner as shown in Example 1, part D, 3-[1-hydroxy-1-(p-chlorophenyl)-3-dimethylaminopropyl]indole propyl iodide was prepared by utilizing 3-[1-hydroxy-1-(p-chlorophenyl)-3-dimethylaminopropyl]indole free base and propyl iodide in lieu of 3-(1-hydroxy-1-phenyl-3-dimethylaminopropyl)indole free base and ethyl bromide.

*Example 4.—5-benzyloxy-3-[1-hydroxy-1-(p-ethoxyphenyl)-3-dimethylaminopropyl]indole*

A. *5 - benzyloxy - 3 - acetylindole.*—5-benzyloxyindole (11.15 g.; 0.05 mole) dissolved in 100 ml. of ether and 100 ml. of benzene was added during five minutes to a Grignard reagent prepared from magnesium (2.68 g.; 0.11 mole) and methyl iodide (17 g.; 0.12 mole). The mixture was refluxed for 75 minutes. It was then cooled in ice and 8.65 g. (0.11 mole) of acetyl chloride in 25 ml. of ether was added dropwise. The resulting mixture was stirred for three hours at about 25° C. The mixture was then cooled in ice and acidified with a solution of 15 ml. of acetic acid in 50 ml. of water. After stirring for 15 minutes the precipitate was recovered by filtration, washed with water and ether, and suspended in 50 ml. of ethanol. A solution of 3 g. of potassium hydroxide in 10 ml. of water was added and the resulting solution was evaporated to about half its volume to yield 5.95 g. of 5-benzyloxy-3-acetylindole which was recrystallized from ethanol and melted at 188–190° C.

B. *5-benzyloxy-3-indolyl 2-dimethylaminoethyl ketone hydrochloride.*—A mixture of 2.65 g. of 5-benzyloxy-3-acetylindole (0.01 mole), 0.98 g. of dimethylamine hydrochloride (0.012 mole), 0.6 g. of paraformaldehyde and 25 ml. of absolute ethanol was refluxed for 26 hours. Crystals appeared after a few hours of refluxing. The mixture was allowed to stand for 12 hours and was then cooled in ice, filtered, and washed with cold methanol and ether to yield 2.48 g. of 5-benzyloxy-3-indolyl 2-dimethylaminoethyl ketone hydrochloride. The hydrochloride was recrystallized twice by dissolving in 75 ml. of absolute ethanol and evaporating to 40 ml. The recrystallized hydrochloride melted at 199.5–200.5° C.

C. *5 - benzyloxy-3-[1-hydroxy-(1-p-ethoxyphenyl-3-dimethylaminopropyl]indole free base.*—In the same manner as shown in Example 2, part B, 5-benzyloxy-3-[1 - hydroxy - (1-p-ethoxyphenyl)- 3-dimethylaminopropyl]indole free base was prepared by utilizing 5-benzyloxy-3-indolyl 2-dimethylaminoethyl ketone hydrochloride and p-ethoxyphenyl magnesium bromide in lieu of 1-methyl-3-indolyl 2-dimethylaminoethyl ketone hydrochloride and phenyl magnesium bromide.

D. *5 - benzyloxy - 3-[1-hydroxy-1-(p-ethoxyphenyl)-3-dimethylaminopropyl]indole tartrate.*—In the same manner as shown in Example 1, part C, 5-benzyloxy-3-[1-hydroxy - 1 - (p-ethoxyphenyl)- 3-dimethylaminopropyl]-indole tartrate was prepared by utilizing stoichiometric quantities of 5-benzyloxy-3-[1-hydroxy-1-(p-ethoxyphenyl)-3-dimethylaminopropyl]indole free base and tartaric acid in lieu of 3-(1-hydroxy-1-phenyl-3-dimethylaminopropyl)indole free base and hydrogen chloride.

E. *5-benzyloxy-3-[1-hydroxy-1-(p-ethoxyphenyl)-3-dimethylaminopropyl]indole methiodide.*—In the same maner as shown in Example 1, part D, 5-benzyloxy-3-[1-hydroxy-1 -(p-ethoxyphenyl)-3-dimethylaminopropyl]-indole methiodide was prepared by utilizing 5-benzyloxy-3 - [1 - hydroxy-1-(p-ethoxyphenyl)-3-dimethylaminopropyl]indole free base and methyl iodide in lieu of 3-(1-hydroxy-1-phenyl-3-dimethylaminopropyl)indole free base and ethyl bromide.

*Example 5.—1-methyl-3[1-hydroxy-1-(p-propylphenyl)-3-dimethylaminopropyl]indole*

A. *1 - methyl - 3 - [1 - hydroxy - 1 - (p-propylphenyl)-3-dimethylaminopropyl]indole free base.*—In the same manner as shown in Example 2, part B, 1-methyl-3-[1-hydroxy-1-(p - propylphenyl)-3-dimethylaminopropyl]indole free base was prepared by utilizing p-propylphenyl magnesium bromide in lieu of phenyl magnesium bromide.

B. *1-methyl-3-[1-hydroxy-1-(p-propylphenyl) - 3 - dimethylaminopropyl]indole benzoate.*—In the same manner as shown in Example 1, part C, 1-methyl-3-[1-hydroxy-1-(p - propylphenyl)-3-dimethylaminopropyl]indole benzoate was prepared by utilizing stoichiometric quantities of 1-methyl-3-[1-hydroxy-1-(p - propylphenyl)-3-dimethylaminopropyl]indole free base and benzoic acid in lieu of 3-(1-hydroxy-1-phenyl-3-dimethylaminopropyl)indole free base and hydrogen chloride.

C. *1-methyl-3-[1 - hydroxy - 1 - (p-propylphenyl)-3-dimethylaminopropyl]indole ethobromide.*—In the same manner as shown in Example 1, part D, 1-methyl-3-[1-hydroxy-1-(p-propylphenyl)- 3 - dimethylaminopropyl]indole ethobromide was prepared by utilizing 1-methyl-3-[1-hydroxy - 1 - (p-propylphenyl) - 3 - dimethylaminopropyl]indole free base in lieu of 3-(1-hydroxy-1-phenyl-3-dimethylaminopropyl)indole free base.

*Example 6.—3-(1-hydroxy-1-phenyl-3-dibenzylaminopropyl)indole*

A. *3-indolyl 2-dibenzylaminoethyl ketone hydrochloride.*—A mixture of 4.35 g. of 3-indolyl methyl ketone, 6.4 g. of dibenzylamine hydrochloride, 1.23 g. of paraformaldehyde and 41 ml. of absolute ethanol was refluxed for 24 hours. The solution was cooled to about 25° C. and crystallization thereupon occurred. The cooled mixture was filtered and the precipitate was washed with methanol and ether to yield 3-indolyl 2-dibenzylaminoethyl ketone hydrochloride which melted at 189–189.5° C.

B. *3-(1-hydroxy-1-phenyl - 3 - dibenzylaminopropyl)indole free base.*—In the same manner as shown in Example 2, part B, 3 - (1-hydroxy-1-phenyl-3-dibenzylaminopropyl)indole free base was prepared by utilizing 3-indolyl 2-dibenzylaminoethyl ketone hydrochloride in lieu of 1-methyl-3-indolyl 2-dimethylaminoethyl ketone hydrochloride.

C. *3 - (1 - hydroxy - 1 - phenyl - 3 - dibenzylaminopropyl)indole hydrobromide.*—In the same manner as shown in Example 1, part C, 3-(1-hydroxy-1-phenyl-3-dibenzylaminopropyl)indole hydrobromide was prepared by utilizing stoichiometric quantities of 3-(1-hydroxy-1-phenyl-3-dibenzylaminoethyl)indole free base and hydrogen bromide in lieu of 3-(1-hydroxy-1-phenyl-3-dimethylaminoethyl)indole free base and hydrogen chloride.

D. *3 - (1 - hydroxy - 1 - phenyl - 3 - dibenzylaminopropyl)indole butyl iodide.*—In the same manner as shown in Example 1, part D, 3-(1-hydroxy-1-phenyl-3-dibenzylaminopropyl)indole butyl iodide was prepared by utilizing 3-(1-hydroxy-1-phenyl-3-dibenzylaminopropyl)indole free base and butyl iodide in lieu of 3-(1-hydroxy-1-phenyl-3-dimethylaminopropyl)indole free base and ethyl bromide.

In the same manner as shown in Example 6, 3-(1-hydroxy-1-phenyl-3-diphenethylaminopropyl)indole free base was prepared by utilizing diphenethylamine hydrochloride in lieu of dibenzylamine hydrochloride.

*Example 7.—1-ethyl-3-(1-hydroxy-1-phenyl-3-dimethylaminopropyl)indole*

A. *1 - ethyl - 3 - indolyl 2-dimethylaminoethyl ketone free base.*—A mixture of 49.32 g. of 1-ethyl-3-acetylindole (0.264 mole), 25.8 g. of dimethylamine hydrochloride (0.316 mole), and 15.85 g. of paraformaldehyde (0.528 mole) in 400 ml. of absolute ethanol was refluxed for 19 hours. The resulting solution was evaporated to dryness on the steam bath under reduced pressure. The residue was dissolved in 350 ml. of water and extracted twice with ether. The brown aqueous solution was cooled in ice and made basic with a solution of potassium hydroxide (33.6 g. in 110 ml. of water). The mixture was extracted three times with ether. The combined ethereal extracts were washed with saturated aqueous sodium chloride solution, dried with anhydrous sodium sulfate and evaporated to give 56 g. of 1-ethyl-3-indolyl 2-dimethylaminoethyl ketone free base.

B. *1 - ethyl - 3 - (1 - hydroxy - 1 - phenyl - 3 - dimethylaminopropyl)indole free base.*—In the same manner as shown in Example 1, part B, 1-ethyl-3-(1-hydroxy-1-phenyl-3-dimethylaminopropyl)indole free base was prepared by utilizing 1-ethyl-3-indolyl 2-dimethylaminoethyl ketone free base in lieu of 3-indolyl 2-dimethylaminoethyl ketone free base.

C. *1 - ethyl - 3 - (1-hydroxy - 1 - phenyl - 3 - dimethylaminopropyl)indole hydrochloride.*—In the same manner as shown in Example 1, part C, 1-ethyl-3-(1-hydroxy-1-phenyl-3-dimethylaminopropyl)indole hydrochloride was prepared by utilizing 1-ethyl-3-(1-hydroxy-1-phenyl-3-dimethylaminopropyl)indole free base in lieu of 3-(1-hydroxy-1-phenyl-3-dimethylaminopropyl)indole free base.

D. *1 - ethyl - 3 - (1 - hydroxy - 1 - phenyl-3-dimethylaminopropyl)indole benzyl chloride.*—In the same manner as shown in Example 1, part D, 1-ethyl-3-(1-hydroxy-1-phenyl-3-dimethylaminopropyl)indole benzyl chloride was prepared by utilizing 1-ethyl-3-(1-hydroxy-1-phenyl-3-dimethylaminopropyl)indole free base and benzyl chloride in lieu of 3 - (1-hydroxy-1-phenyl-3-dimethylaminopropyl)indole free base and ethyl bromide.

*Example 8.—3-[1-hydroxy-1-(p-tolyl)-2-methyl-3-dimethylaminopropyl]indole*

A. *1-dimethylaminomethyl-3-indolyl 1 - methyl - 2 - dimethylaminoethyl ketone free base.*—3-propionylindole was prepared in the same manner disclosed in Example 4, part A, by substituting indole and propionyl chloride for 5-benzyloxyindole and acetyl chloride.

A mixture of 3.46 g. of 3-propionylindole (0.02 mole), 8.16 g. of dimethylamine hydrochloride (0.1 mole), 4.5 g. of paraformaldehyde (0.15 mole), and 70 ml. of absolute ethanol was refluxed for 28 hours. The mixture was evaporated to about 15 ml. and water was added which resulted in a precipitate consisting essentially of unchanged 3-propionylindole. The mixture was filtered and the filtrate was extracted twice with chloroform. The aqueous layer was made basic with 10% aqueous potassium hydroxide solution and extracted with chloroform. The chloroform extracts were washed with saturated sodium chloride solution, dried with anhydrous sodium sulfate and evaporated to give 1.5 g. of 1-dimethylaminomethyl-3-indolyl 1-methyl-2-dimethylaminoethyl ketone free base as a yellow oil.

B. *3-indolyl 1-methyl-2-dimethylaminoethyl ketone free base.*—A solution of 1.95 g. of potassium hydroxide in 5 ml. of water was added to a solution of 1-dimethylaminomethyl-3-indolyl 1-methyl- 2 - dimethylaminoethyl ketone free base in 12.5 ml. of methanol and the resulting solution was refluxed for one-half hour. The mixture was evaporated on the steam bath under reduced pressure and 20 ml. of water was then added. The resulting mixture was extracted three times with a total of 50 ml. of chloroform. The chloroform extracts were washed once with water and then three times with 10% hydrochloric acid (20, 10 and 10 ml. portions). The combined acid extracts were washed once with 10 ml. of chlorofirm and then poured into an ice-cold solution of 20 ml. of 25% aqueous potassium hydroxide solution. The resulting mixture was extracted three times with ether (total 150 ml.). The combined ethereal extracts were washed once with water, once with saturated aqueous sodium chloride solution, dried with anhydrous sodium sulfate and evaporated to give 0.543 g. of a yellow glassy solid. The product was recrystallized from a mixture of 3 ml. of ethyl acetate and 9 ml. of petroleum ether; 0.265 g. of 3-indolyl 1-methyl-2-dimethylaminoethyl ketone free base was thus obtained. The compound melted at 101–102° C.

C. *3-[1-hydroxy-1-(p-tolyl)-2-methyl-3-dimethylaminopropyl]indole free base.*—In the same manner as shown in Example 1, part B, 3-[1-hydroxy-1-(p-tolyl)-2-methyl-3-dimethylaminopropyl]indole free base was prepared by utilizing 3-indolyl 1-methyl-2-dimethylaminoethyl ketone free base and p-tolyl magnesium bromide in lieu of 3-indolyl 2-dimethylaminoethyl ketone free base and phenyl magnesium bromide.

D. *3-[1-hydroxy-1-(p-tolyl)-2-methyl-3-dimethylaminopropyl]indole phosphate.*—In the same manner as shown in Example 1, part C, 3-[1-hydroxy-1-(p-tolyl)-2-methyl-3-dimethylaminopropyl]indole phosphate was prepared by utilizing stoichiometric quantities of 3-[1-hydroxy-1-(p-tolyl)-2-methyl-3-dimethylaminopropyl]indole free base and phosphoric acid in lieu of 3-(1-hydroxy-1-phenyl-3-dimethylaminopropyl)indole free base and hydrogen chloride.

E. *3-[1-hydroxy-1-(p-tolyl)-2-methyl-3-dimethylaminopropyl]indole dimethyl sulfate.*—In the same manner as shown in Example 1, part D, 3-[1-hydroxy-1-(p-tolyl)-2-methyl-3-dimethylaminopropyl]indole dimethyl sulfate was prepared by utilizing 3-[1-hydroxy-1-(p-tolyl)-2-methyl-3-dimethylaminopropyl]indole free base and dimethyl sulfate in lieu of 3-(1-hydroxy-1-phenyl-3-dimethylaminopropyl)indole free base and ethyl bromide.

*Example 9.—3-[1-hydroxy-1-(p-methoxyphenyl)-2-ethyl-3-dimethylaminopropyl]indole*

A. *1-dimethylaminomethyl-3-indolyl 1-ethyl-2-dimethylaminoethyl ketone free base.*—A mixture of 6.77 g. (0.0362 mole) of 3-butyrylindole (Oddo et al., Beilstein 21,303), 14.8 g. (0.181 mole) of dimethylamine hydrochloride, 8.2 g. (0.273 mole) of paraformaldehyde and 135 ml. of absolute ethanol was refluxed for 26 hours. The resulting yellow solution was evaporated on the steam bath and 60 ml. of water was added. The mixture was then filtered and the filtrate was extracted with three 50 ml. portions of ether, the remaining filtrate was cooled in ice, and then made basic with a solution of potassium carbonate (19 g. in 39 ml. of water). The mixture was extracted three times with 60 ml. portions of ether. The combined ether extracts were washed with water and then with saturated aqueous sodium chloride solution, dried with anhydrous sodium sulfate, and evaporated under reduced pressure to produce 2.94 g. of yellow oil which solidified after 12 hours. The product was recrystallized from isopropyl ether to produce 0.33 g. of 1-dimethylaminomethyl-3-indolyl 1-ethyl-2-dimethylaminoethyl ketone free base which melted at 78–80° C.

B. *3-indolyl 1-ethyl-2-dimethylaminoethyl ketone free base.*—In the same manner as shown in Example 8, part B, 3-indolyl 1-ethyl-2-dimethylaminoethyl ketone free base was prepared by hydrolyzing 1-dimethylaminomethyl-3-indolyl 1-ethyl-2-dimethylaminoethyl ketone free base in lieu of 1-dimethylaminomethyl-3-indolyl 1-methyl-2-dimethylaminoethyl ketone free base.

C. *3-[1-hydroxy-1-(p-methoxyphenyl)-2 - ethyl - 3 - dimethylaminopropyl]indole free base.*—In the same manner as shown in Example 1, part B, 3-[1-hydroxy-1-(p- methoxyphenyl)-2-ethyl - 3 - dimethylaminopropyl]indole free base was prepared by utilizing 3-indolyl 1-ethyl-2-dimethylaminoethyl ketone free base and p-methoxyphenyl magnesium bromide in lieu of 3-indolyl 2-dimethylaminoethyl ketone free base and phenyl magnesium bromide.

D. *3-[1-hydroxy-1-(p-methoxyphenyl)-2 - ethyl - 3 - dimethylaminopropyl]indole acetate.*—In the same manner as shown in Example 1, part C, 3-[1-hydroxy-1-(p-methoxyphenyl)-2-ethyl-3-dimethylaminopropyl]indole acetate was prepared by utilizing stoichiometric quantities of 3-[1-hydroxy-1-(p-methoxyphenyl)-2-ethyl - 3 - dimethylaminopropyl]indole free base and acetic acid in lieu of 3-(1-hydroxy-1-phenyl-3-dimethylaminopropyl)indole free base and hydrogen chloride.

E. *3-[1-hydroxy-1-(p-methoxyphenyl)-2 - ethyl - 3 - dimethylaminopropyl]indole propyl bromide.*—In the same manner as shown in Example 1, part D, 3-[1-hydroxy-1-(p-methoxyphenyl)-2-ethyl - 3 - dimethylaminopropyl]indole propyl bromide was prepared by utilizing 3-[1-hydroxy-1-(p-methoxyphenyl)-2 - ethyl - 3 - dimethylaminopropyl]indole free base and propyl bromide in lieu of 3-(1-hydroxy-1-phenyl-3-dimethylaminopropyl)indole free base and ethyl bromide.

Example 10.—*1-methyl-3-(1-hydroxy-1-phenyl-2-methyl-3-dimethylaminopropyl)indole*

A. *1-methyl-3-propionylindole.*—A suspension of 51 g. of 3-propionylindole (0.295 mole) in 530 ml. of water and 52 g. of sodium hydroxide was heated to 70° C. on the steam bath. Heating was discontinued and 56 ml. of dimethyl sulfate was added during five minutes. Addition of dimethyl sulfate and sodium hydroxide was repeated two more times and the mixture was then heated at 95° C. for 2.5 hours. The oily layer solidified after 12 hours. The solid was recovered by filtration and washed with water. The product was dissolved in 800 ml. of ether, filtered from a brown impurity, and evaporated until crystallization started. The product, 1-methyl-3-propionylindole, weighed 40.15 g. and melted at 80–81.5° C.

B. *1-methyl-3-indolyl 1-methyl-2-dimethylaminoethyl ketone free base.*—A mixture of 9.35 g. of 1-methyl-3-propionylindole (0.05 mole), 20.4 g. of dimethylamine hydrochloride (0.25 mole), 11.3 g. of paraformaldehyde (0.375 mole) and 175 ml. of absolute ethanol was refluxed for 21 hours. The mixture was evaporated to dryness and the resulting oily solid was treated with 100 ml. of waer, filtered, and washed with water. The aqueous filtrate was extracted twice with 100 ml. portions of ether and was then cooled in ice and made basic with a solution of 17 g. of potassium hydroxide in 50 ml. of water. The resulting mixture was extracted three times with 350 ml. of ether. The combined extracts were washed once with water, once with saturated aqueous sodium chloride solution, dried with anhydrous sodium sulfate and evaporated to give 4.0 g. of an oil which solidified on standing. The product, 1-methyl-3-indolyl 1-methyl-2-dimethylaminoethyl ketone free base, was recrystallized from Skellysolve B and melted at 79.5–80.5° C.

C. *1-methyl-3-(1-hydroxy-1-phenyl-2-methyl-3-dimethylaminopropyl)indole free base.*—In the same manner as shown in Example 1, part B, 1-methyl-3-(1-hydroxy-1-phenyl-2-methyl-3-dimethlaminopropyl)indole free base was prepared by utilizing 1-methyl-3-indolyl 1-methyl-2-dimethylaminoethyl ketone free base in lieu of 3-indolyl 2-dimethylaminoethyl ketone free base.

In the same manner as shown in Example 10, 1-methyl-3-(1-hydroxy-1-phenyl-2-methyl - 3 - dicyclopentylaminopropyl)indole free base was prepared by utilizing dicyclopentylamine hydrochloride in lieu of dimethylamine hydrochloride.

Example 11.—*7-methoxy-3-[1-hydroxy-1-(p-propoxyphenyl)-2,3-dipropyl-3-dibutylaminopropyl]indole*

A. *7-methoxy-3-valerylindole.*—In the same manner as shown in Example 4, part A, 7-methoxy-3-valerylindole was prepared utilizing 7-methoxyindole (C.A. 44, 604c) and valeryl chloride in lieu of 5-benzyloxyindole and acetyl chloride.

B. *1-(1-dibutylaminobutyl)-7-methoxy - 3 - indolyl 1,2-dipropyl-2-dibutylaminoethyl ketone free base.*—In the same manner as shown in Example 8, part A, 1-(1-dibutylaminobutyl)-7-methoxy-3-indolyl 1,2-dipropyl-2-dibutylaminoethyl ketone free base was prepared using 7-methoxy-3-valerylindole, dibutylamine hydrochloride, and butyraldehyde in lieu of 3-propionylindole, dimethylamine hydrochloride, and paraformaldehyde.

C. *7-methoxy-3-indolyl 1,2-dipropyl - 2 - dibutylaminoethyl ketone free base.*—In the same manner as shown in Example 8, part B, 7-methoxy-3-indolyl 1,2-dipropyl-2-dibutylaminoethyl ketone free base was prepared by hydrolyzing 1-(1-dibutylaminobutyl)-7-methoxy-3-indolyl 1,2-dipropyl-2-dibutylaminoethyl ketone free base in lieu of 1-dimethylaminomethyl-3-indolyl 1-methyl-2-dimethylaminoethyl ketone free base.

D. *7-methoxy-3-[1-hydroxy - 1 - (p-propoxyphenyl)-2,3-dipropyl-3-dibutylaminopropyl]indole free base.*—In the same manner as shown in Example 1, part B, 7-methoxy-3-[1-hydroxy-1-(p-propoxyphenyl) - 2,3 - dipropyl-3-dibutylaminopropyl]indole free base was prepared by utilizing 7-methoxy-3-indolyl 1,2-dipropyl-2-dibutylaminoethyl ketone free base and p-propoxyphenyl magnesium bromide in lieu of 3-indolyl 2-dimethylaminoethyl ketone free base and phenyl magnesium bromide.

E. *7-methoxy-3-[1-hydroxy - 1 - (p-propoxyphenyl)-2,3-dipropyl - 3 - dibutylaminopropyl]indole tartrate.*—In the same manner as shown in Example 1, part C, 7-methoxy-3-[1-hydroxy - 1 - (p-propoxyphenyl)-2,3-dipropyl-3-dibutylaminopropyl]indole tartrate was prepared by utilizing stoichiometric quantities of 7-methoxy-3-[1-hydroxy-1-(p-propoxyphenyl)-2,3-dipropyl - 3 - dibutylaminopropyl]indole free base and tartaric acid in lieu of 3-(1-hydroxy-1-phenyl - 3 - dimethylaminopropyl)indole free base and hydrogen chloride.

Example 12.—*1-hexyl-6-benzyloxy-3-[1-hydroxy-1-(p-fluorophenyl)-3-butyl-3-dipropylaminopropyl]indole*

A. *1-hexyl-6-benzyloxy-3-acetylindole.*—In the same manner as shown in Example 4, part A, 6-benzyloxy-3-acetylindole was prepared utilizing 6-benzyloxyindole in lieu of 5-benzyloxyindole. The resulting 6-benzyloxy-3-acetylindole was reacted with hexyl iodide in the manner disclosed by Baker, supra, to produce 1-hexyl-6-benzyloxy-3-acetylindole.

B. *1-hexyl-6-benzyloxy-3-indolyl 2-butyl-2-dipropylaminoethyl ketone hydrochloride.*—In the same manner as shown in Example 2, part A, 1-hexyl-6-benzyloxy-3-indolyl 2-butyl-2-dipropylaminoethyl ketone hydrochloride was prepared using 1-hexyl-6-benzyloxy-3-acetylindole, dipropylamine hydrochloride and valeraldehyde in lieu of 1-methyl - 3 - acetylindole, dimethylamine hydrochloride, and paraformaldehyde.

C. *1-hexyl-6-benzyloxy-3-[1-hydroxy-1-(p-fluorophenyl)-3-butyl-3-dipropylaminopropyl]indole free base.*—In the same manner as shown in Example 2, part B, 1-hexyl-6-benzyloxy-3-[1-hydroxy-1-(p-fluorophenyl) - 3 - butyl-3-dipropylaminopropyl]indole free base was prepared by utilizing 1-hexyl-6-benzyloxy-3-indolyl 2-butyl-2-dipropylaminoethyl ketone hydrochloride and p-fluorophenyl magnesium bromide in lieu of 1-methyl-3-indolyl 2-dimethylaminopropyl ketone hydrochloride and phenyl magnesium bromide.

*Example 13.—1-ethyl-5-methoxy-3-[1-hydroxy-1-(p-ethylphenyl)-3-methyl-3-morpholinopropyl]indole*

A. *1-ethyl-5-methoxy - 3 - acetylindole.*—In the same manner as shown in Example 4, part A, 5-methoxy-3-acetylindole was prepared by utilizing 5-methoxyindole in lieu of 5-benzyloxyindole. The resulting 5-methoxy-3-acetylindole was reacted with ethyl iodide in the manner disclosed by Baker, supra, to produce 1-ethyl-5-methoxy-3-acetylindole.

B. *1-ethyl-5-methoxy-3-indolyl 2-methyl-2-morpholinoethyl ketone hydrochloride.*—In the same manner as shown in Example 2, part A, 1-ethyl-5-methoxy-3-indolyl 2-methyl-2-morpholinoethyl ketone hydrochloride was prepared by utilizing 1-ethyl-5-methoxy-3-acetylindole, acetaldehyde, and morpholine hydrochloride in lieu of 1-methyl-3-acetylindole, formaldehyde, and dimethylamine hydrochloride.

C. *1 - ethyl-5-methoxy-3-[1-hydroxy-1-(p-ethylphenyl)-3-methyl-3-morpholinopropyl]indole free base.*—In the same manner as shown in Example 2, part B, 1-ethyl-5-methoxy-3-[1-hydroxy - 1 - (p - ethylphenyl)-3-methyl-3-morpholinopropyl]indole free base was prepared by utilizing 1-ethyl-5-methoxy-3-indolyl 2-methyl - 2 - morpholinoethyl ketone hydrochloride and p-ethylphenyl magnesium bromide in lieu of 1-methyl-3-indolyl 2-dimethylaminoethyl ketone hydrochloride and phenyl magnesium bromide.

*Example 14.—3-[1-hydroxy-1-(p-butylphenyl)-3-isopropyl-3-dimethylaminopropyl]indole*

A. *3-indolyl 2-isopropyl-2-dimethylaminoethyl ketone free base.*—In the same manner as shown in Example 1, part A, 3-indolyl 2-isopropyl-2-dimethylaminoethyl ketone free base was prepared by substituting isobutyraldehyde for paraformaldehyde.

B. *3-[1-hydroxy-1-(p-butylphenyl) - 3 - isopropyl-3-dimethylaminopropyl]indole free base.*—In the same manner as shown in Example 1, part B, 3-[1-hydroxy-1-(p-butylphenyl) - 3 - isopropyl - 3 - dimethylaminopropyl]indole free base was prepared by utilizing 3-indolyl 2-isopropyl-2-dimethylaminoethyl ketone free base and p-butylphenyl magnesium bromide in lieu of 3-indolyl 2-dimethylaminoethyl ketone free base and phenyl magnesium bromide.

C. *3-[1-hydroxy-1-(p-butylphenyl) - 3 - isopropyl-3-dimethylaminopropyl]indole ethobromide.*—In the same manner as shown in Example 1, part D, 3-[1-hydroxy-1-(p-butylphenyl)-3-isopropyl - 3 - dimethylaminopropyl]indole ethobromide was prepared by utilizing 3-[1-hydroxy-1-(p-butylphenyl)-3-isopropyl - 3 - dimethylaminopropyl]indole free base in lieu of 3-(1-hydroxy-1-phenyl-3-dimethylaminopropyl)indole free base.

*Example 15.—5-(para-methylbenzyloxy)-3-[1-hydroxy-1-(p-butoxyphenyl)-2-butyl-3-piperidinopropyl]indole*

A. *5-(para-methylbenzyloxy)-3-caproylindole.*—In the same manner as shown in Example 4, part A, 5-(para-methylbenzyloxy)-3-caproylindole was prepared by substituting 5-(para-methylbenzyloxy)indole and caproyl chloride for 5-benzyloxyindole and acetyl chloride.

B. *1-piperidinomethyl - 5 - (para-methylbenzyloxy)-3-indolyl 1-butyl-2-piperidinoethyl ketone free base.*—In the same manner as shown in Example 8, part A, 1-piperidinomethyl-5-(para-methylbenzyloxy)-3-indolyl 1-butyl-2-piperidinoethyl ketone free base was prepared by substituting 5-(para-methylbenzyloxy) - 3 - caproylindole and piperidine hydrochloride for 3-propionylindole and dimethylamine hydrochloride.

C. *5-(para-methylbenzyloxy) - 3 - indolyl 1 - butyl-2-piperidinoethyl ketone free base.*—In the same manner as shown in Example 8, part B, 5-(para-methylbenzyloxy)-3-indolyl 1-butyl-2-piperidinoethyl ketone free base was prepared by hydrolyzing 1-piperidinomethyl - 5 - (para-methylbenzyloxy)-3-indolyl 1-butyl-2-piperidinoethyl ketone free base in lieu of 1-dimethylaminomethyl-3-indolyl 1-methyl-2-dimethylaminoethyl ketone free base.

D. *5-(para-methylbenzyloxy) - 3 - [1 - hydroxy-1-(p-butoxyphenyl)-2-butyl - 3 - piperidinopropyl[indole free base.*—In the same manner as shown in Example 1, part B, 5 - (para - methylbenzyloxy)-3-[1-hydroxy-1-(p-butoxyphenyl)-2-butyl-3-piperidinopropyl]indole free base was prepared by utilizing 5-(para-methylbenzyloxy)-3-indolyl 1-butyl-2-piperidinoethyl ketone free base and p-butoxyphenyl magnesium bromide in lieu of 3-indolyl 2-dimethylaminoethyl ketone free base and phenyl magnesium bromide.

*Example 16.—1-propyl-6-ethoxy-3-(1-hydroxy-1-phenyl-3-pyrrolidinopropyl)indole*

A. *1-propyl-6-ethoxy - 3 - acetylindole.*—In the same manner as shown in Example 4, part A, 6-ethoxy-3-acetylindole was prepared by utilizing 6-ethoxyindole in lieu of 5-benzyloxyindole. The resulting product was reacted with propyl iodide in the manner disclosed by Baker, supra, to produce 1-propyl-6-ethoxy-3-acetylindole.

B. *1-propyl-6-ethoxy-3-indolyl - 2 - pyrrolidinoethyl ketone hydrochloride.*—In the same manner as shown in Example 2, part A, 1-propyl-6-ethoxy-3-indolyl 2-pyrrolidinoethyl ketone hydrochloride was prepared by utilizing 1-propyl-6-ethoxy-3-acetylindole and pyrrolidine hydrochloride in lieu of 1-methyl-3-acetylindole and dimethylamine hydrochloride.

C. *1-propyl-6-ethoxy-3-(1-hydroxy - 1 - phenyl-3-pyrrolidinopropyl)indole free base.*—In the same manner as shown in Example 2, part B, 1-propyl-6-ethoxy-3-(1-hydroxy-1-phenyl-3-pyrrolidinopropyl)indole free base was prepared by utilizing 1-propyl-6-ethoxy-3-indolyl 2-pyrrolidinoethyl ketone hydrochloride in lieu of 1-methyl-3-indolyl 2-dimethylaminoethyl ketone hydrochloride.

*Example 17.—7-benzhydryloxy-3-(1-hydroxy-1-phenyl-3-piperidinopropyl)indole*

A. *7-benzhydryloxy-3-acetylindole.*—In the same manner as shown in Example 4, part A, 7-benzhydryloxy-3-acetylindole was prepared by utilizing 7-benzhydryloxyindole in lieu of 5-benzyloxyindole.

B. *7-benzhydryloxy-3-indolyl 2-piperidinoethyl ketone hydrochloride.*—In the same manner as shown in Example 4, part B, 7-benzhydryloxy-3-indolyl 2-piperidinoethyl ketone hydrochloride was prepared by substituting 7-benzhydryloxy-3-acetylindole and piperidine hydrochloride for 5-benzyloxy-3-acetylindole and dimethylamine hydrochloride.

C. *7-benzhydryloxy-3-(1-hydroxy-1-phenyl - 3 - piperidinopropyl)indole free base.*—In the same manner as shown in Example 2, part B, 7-benzhydryloxy-3-(1-hydroxy-1-phenyl-3-piperidinopropyl) indole free base was prepared by substituting 7-benzhydryloxy-3-indolyl 2-piperidinoethyl ketone hydrochloride for 1-methyl-3-indolyl 2-dimethylaminoethyl ketone hydrochloride.

*Example 18.—1-butyl-6-(p-chlorobenzyloxy)-3 - [1 - hydroxy-1-(p-ethylphenyl)-3-dihexylaminopropyl]indole*

A. *1-butyl-6-(p-chlorobenzyloxy)-3-acetylindole.* — In the same manner as shown in Example 4, part A, 6-(p-chlorobenzyloxy)-3-acetylindole was prepared by utilizing 6-(p-chlorobenzyloxy)indole in lieu of 5-benzyloxyindole. The resulting compound was reacted with butyl iodide in the manner disclosed by Baker, supra, to produce 1-butyl-6-(p-chlorobenzyloxy)-3-acetylindole.

B. *1-butyl-6-(p-chlorobenzyloxy)-3-indolyl 2-dihexylaminoethyl ketone hydrochloride.*—In the same manner as shown in Example 4, part B, 1-butyl-6-(p-chlorobenzyloxy)-3-indolyl 2-dihexylaminoethyl ketone hydrochloride was prepared by utilizing 1-butyl-6-(p-chlorobenzyloxy)-3-acetylindole and dihexylamine hydrochloride in lieu of 5-benzyloxy-3-acetylindole and dimethylamine hydrochloride.

C. *1-butyl-6-(p-chlorobenzyloxy)-3-[1-hydroxy-1 - (p-ethylphenyl)-3-dihexylaminopropyl]indole free base.*—In the same manner as shown in Example 2, part B, 1-butyl-6-(p-chlorobenzyloxy)-3-[1-hydroxy-1-(p - ethylphenyl)-3-dihexylaminopropyl]indole free base was prepared by utilizing 1-butyl-6-(p-chlorobenzyloxy)-3-indolyl 2-dihexylaminoethyl ketone hydrochloride and p-ethylphenyl magnesium bromide in lieu of 1-methyl-3-indolyl 2-dimethylaminoethyl ketone hydrochloride and phenyl magnesium bromide.

*Example 19. — 5-hydroxy-3-[1-hydroxy-1-(p-ethoxyphenyl)-3-dimethylaminopropyl]indole free base*

5-hydroxy-3-[1-hydroxy-1-(p-ethoxyphenyl)-3-dimethylaminopropyl]indole free base was prepared by debenzylating 5-benzyloxy-3-[1-hydroxy-1-(p-ethoxyphenyl)-3-dimethylaminopropyl]indole free base (Example 4, part C) by the action of hydrogen in the presence of a palladium-charcoal catalyst according to the process disclosed in U.S. Patent 2,708,197.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of (1) a 3-(1-hydroxy-1-phenyl-3-aminopropyl)indole having the formula:

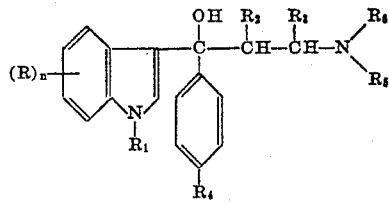

wherein $n$ is an integer from zero to 4, inclusive, R is selected from the group consisting of hydroxy, aralkoxy of 7 to 15 carbon atoms, inclusive, and lower-alkoxy of 1 to 8 carbon atoms, inclusive, $R_1$ is selected from the group consisting of hydrogen and lower-alkyl of 1 to 6 carbon atoms, inclusive, $R_2$ and $R_3$ are selected from the group consisting of hydrogen and lower-alkyl of 1 to 4 carbon atoms, inclusive, $R_4$ is selected from the group consisting of hydrogen, halogen, lower-alkyl of 1 to 4 carbon atoms, inclusive, and lower-alkoxy of 1 to 4 carbon atoms, inclusive, $R_5$ and $R_6$ are selected from the group consisting of lower-alkyl of 1 to 8 carbon atoms, inclusive, cycloalkyl of 4 to 8 carbon atoms, inclusive, aralkyl of 7 to 13 carbon atoms, inclusive, aryl of 6 to 10 carbon atoms, inclusive, and $R_5$ and $R_6$ when taken together with —N< also represent heterocyclic amino of 4 to 6 carbon atoms, inclusive, selected from the group consisting of morpholino, piperidino, pyrrolidino, thiamorpholino, and hexamethyleneimino, (2) acid addition salts thereof, and (3) quaternary ammonium salts selected from the group consisting of lower-alkyl, lower-alkenyl, and benzyl quaternary ammonium salts.

2. A 3-(1-hydroxy-1-phenyl-3-aminopropyl)indole having the formula:

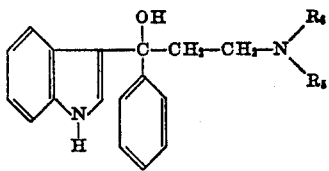

wherein $R_5$ and $R_6$ are lower-alkyl of 1 to 8 carbon atoms, inclusive.

3. A 3-(1-hydroxy-1-phenyl-3-aminopropyl)indole having the formula:

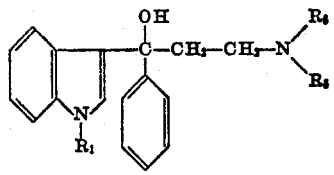

wherein $R_1$ is lower-alkyl of 1 to 6 carbon atoms, inclusive, and $R_5$ and $R_6$ are lower-alkyl of 1 to 8 carbon atoms, inclusive.

4. A 3-(1-hydroxy-1-phenyl-3-aminopropyl)indole having the formula:

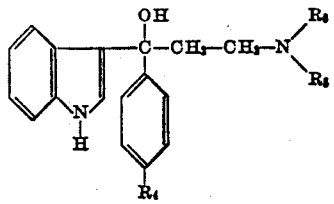

wherein $R_4$ is halogen and $R_5$ and $R_6$ are lower-alkyl of 1 to 8 carbon atoms, inclusive.

5. A 3-(1-hydroxy-1-phenyl-3-aminopropyl)indole having the formula:

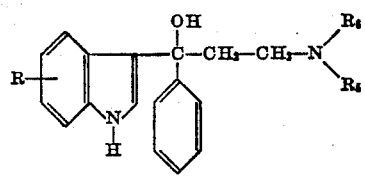

wherein R is aralkoxy of 7 to 15 carbon atoms, inclusive, and $R_5$ and $R_6$ are aralkyl of 7 to 13 carbon atoms, inclusive.

6. 3-(1-hydroxy-1-phenyl - 3 - dimethylaminopropyl)indole.

7. 1-methyl-3-(1-hydroxy-1-phenyl-3 - dimethylaminopropyl)indole.

8. 3-[1-hydroxy-1-(p-chlorophenyl)-3 - dimethylaminopropyl]indole.

References Cited in the file of this patent

UNITED STATES PATENTS 2,825,734    Speeter                Mar. 4, 1958